P. H. HERRICK.
TOY VEHICLE.
APPLICATION FILED OCT. 13, 1917.
1,349,509.
Patented Aug. 10, 1920.
2 SHEETS—SHEET 1.
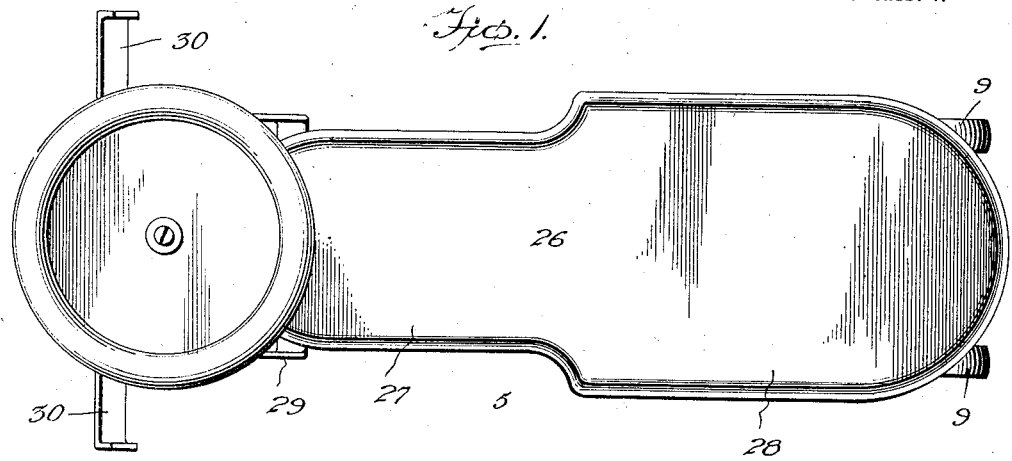
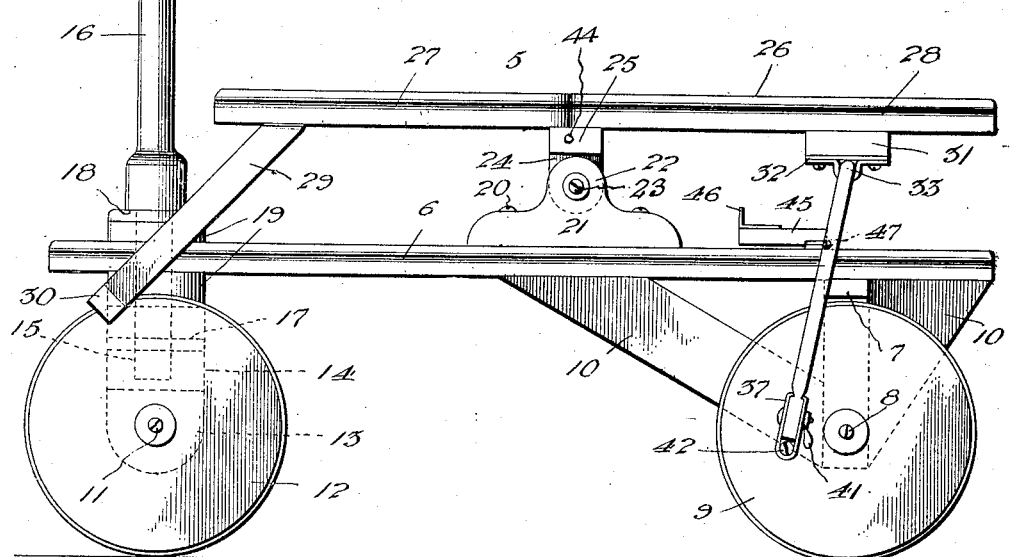
WITNESSES
INVENTOR
P. H. Herrick.
BY Victor J. Evans
ATTORNEY P. H. HERRICK.
TOY VEHICLE.
APPLICATION FILED OCT. 13, 1917.
1,349,509.
Patented Aug. 10, 1920.
2 SHEETS—SHEET 2.
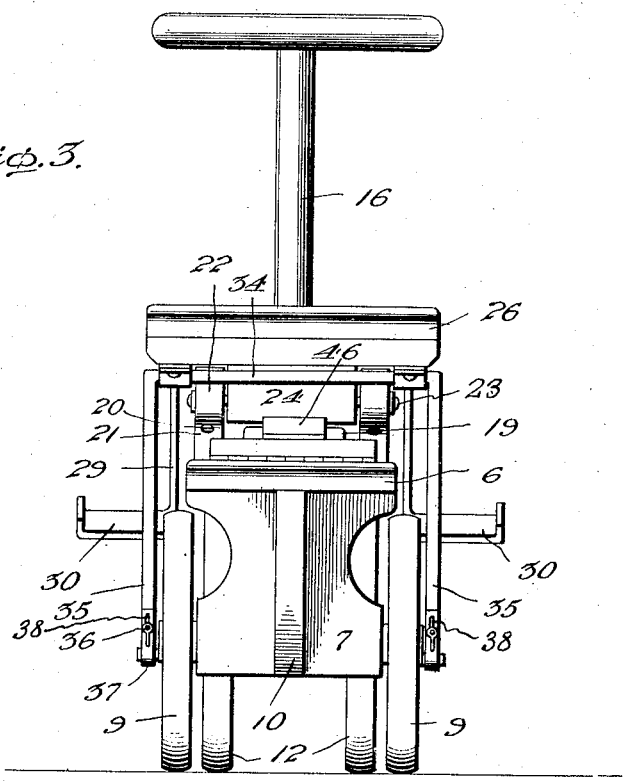
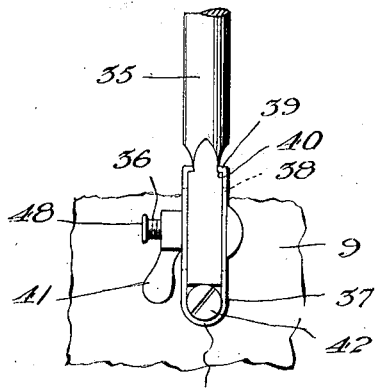
WITNESSES
INVENTOR
P. H. Herrick.
BY Victor J. Evans
ATTORNEY

UNITED STATES PATENT OFFICE.

PERCY H. HERRICK, OF PITTSBURGH, PENNSYLVANIA.

TOY VEHICLE.

1,349,509. Specification of Letters Patent. Patented Aug. 10, 1920.

Application filed October 13, 1917. Serial No. 196,452.

*To all whom it may concern:*

Be it known that I, PERCY H. HERRICK, a citizen of the United States, residing at Pittsburgh, in the county of Allegheny and State of Pennsylvania, have invented new and useful Improvements in Toy Vehicles, of which the following is a specification.

This invention relates generally to vehicles, and more particularly to an occupant propelled vehicle.

The primary object of the invention resides in the production of a vehicle of the above stated character wherein novel means are employed for easily and readily converting the vehicle from an occupant propelled vehicle to a coaster vehicle.

A further object of the invention contemplates, among other features, the provision of a rocking top or seat upon which the occupant is to ride, said seat being connected at one end to the rear or drive wheels of the vehicle through the medium of a crank and having a stirrup on the other end whereby movement of the occupant's body upon the seat, causes the crank arm to pass the dead center at the end of its strokes.

A still further object of the invention embodies a novel construction of fastener capable of permitting the crank to be disconnected from the drive wheels of the vehicle, when the user is desirous of the employment of the vehicle for coasting purposes.

Furthermore, I aim in providing on the platform of the vehicle a hingedly mounted support for retaining the top or seat in a stationary position for preventing any accidental rocking movement of the same.

With the above and other objects in view, the invention consists in the novel features, details of construction and combination of parts which will hereinafter be more fully set forth, illustrated in the accompanying drawings and pointed out in the appended claims.

In the drawings:

Figure 1 is a top plan view;

Fig. 2 is a side elevation;

Fig. 3 is a rear elevation;

Fig. 4 is an enlarged detail view illustrating the manner of connecting the seat with the drive wheels of the vehicle; and Fig. 5 is a detail side elevation with the released position of the crank illustrated in dotted lines.

Referring more particularly to the accompanying drawing, wherein is illustrated one of the preferred embodiments of the invention, I have shown the wheeled vehicle denoted generally by the character 5 and comprising a platform 6. A bolster 7 is secured to the under surface of the platform 6 transversely thereof and at a point adjacent its rear end and having journaled therein a rear axle 8 on which are mounted the rear or drive wheels 9, and this bolster 7 is well reinforced at both sides by braces 10. The front axle 11 on which the front wheels 12 of the vehicle are mounted is journaled in a hub 13, while formed on the said hub is an upstanding bearing 14 having a socket 15 in which the lower reduced extremity of the steering post 16 is connected through the medium of a pin 17. The reduced extremity of the steering post provides a shoulder 18 and interposed between the same and the platform are bearing disks or washers 10.

Mounted upon the top surface of the platform 6 and stationarily secured thereto at a point substantially medially of its length through the medium of fasteners 20 is a pair of blocks 21 each provided with spaced vertically disposed apertured ears 22 between which is pivotally connected as at 23 the stem 24 of the T-shaped head 25, the latter being transversely secured to the under face of a seat or top 26. This seat or top when so connected with the platform is arranged in superposed relation thereto and in a spaced longitudinal plane, adapting the same for longitudinal rocking movement in a forward and rearward direction, and in order to prevent the occupant's obstruction to the propelling action of the car, I provide the top or seat with a forward reduced portion 27 and a rear broad portion 28. 29 denotes a substantially U-shaped support having its horizontal connecting portion arranged transversely of the top or seat and secured to the under surface thereof at a point adjacent the free terminal of the reduced portion 27. This construction of support provides a pair of stirrups 30 in which the feet of the occupant are placed, and owing to the specific configuration of these stirrups, the occupant is enabled to subject the top or seat to a forward thrust or rocking movement. On the bottom face of the broad rear portion of this top or seat is secured a substantially rectangular block 31 having connected therewith a plurality of bearing plates 32 in which is journaled the horizontal portion 33 of a substantially inverted U-shaped pitman or crank 34. Each of the spaced parallel arms 35 of this crank have terminally secured thereto, through the medium of a bolt 36 a yieldable U-shaped loop 37. The bolt 36 is projected through the elongated slots 38 provided in each of the limbs of the loop to permit of the removal of said loop. I terminally provide each of the limbs with inturned hooked ends 39 adapted to engage in similarly formed sockets 40 of the arms, and to be retained therein when the thumb nut 41 is screwed into contact with the strap. The strap when in this position will permit the clamping of the crank pins 42 in the connecting portion 43 thereof and securely hold the pins in contact with the confronting surfaces of the strap or loop, and the lower extremities of the arms 35, upon the connection of the crank or pitman with the rear drive wheels 9 of the vehicle. The specific arrangement of the stirrups 30 is such that the pitman or crank will be thrown past the dead center at the ends of its strokes, when movement is imparted to the platform, and such operation is repeated to propel the vehicle over floors or level surfaces.

One of the chief characteristics in the provision of a crank or pitman adaptable for disconnection with the rear or drive wheels of the vehicle, is to facilitate the conversion of the latter from an occupant propelled vehicle into a vehicle of the coaster type. Therefore, the loosening of the thumb nut 41, will allow the legs of the loop or strap to expand and be adjusted to permit of the loop being swung in a horizontal direction for clearing the crank pins 42 and to permit of the arms of the pitman or crank to be swung in an upward vertical direction, so as to bring the studs 44 within the connecting portion or sockets of the loop. When the stud 44 receives the loop, the crank arms will then be retained in an inactive or elevated position, better shown in dotted lines in Fig. 5 of the drawings. After this operation, the hingedly connected support 45 is swung in an upward vertical direction until the leg 46 thereof is brought to bear against the under surface of the block 31, causing the top or seat 26 to be stationarily supported. This support 45 is hingedly connected through the medium of the hinge 47 to the top face of the platform 6. Furthermore, the inner end of the bolt 36 is upset as at 48 to prevent any accidental loss or displacement of said thumb nut.

From the foregoing description, taken in connection with the accompanying drawings, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is :—

1. A device of the class described comprising a wheeled platform, a top having connections with the platform for rocking movement, a bearing block secured to said top, a pitman pivoted in said bearing block and having detachable connection at the extremity thereof with both the top and certain of the wheels of the platform, and means hingedly connected on the platform and engaging under the bearing block for holding the top stationary.

2. A device of the class described embodying guide wheels and propelling wheels, crank pins on said propelling wheels, a platform, a top having connections with the platform for rocking movement, a pitman pivoted on said rocking member, loops, and clamping bolts for connecting the loops to the pitman for a lateral swinging movement, said loops adapted to have detachable engagement with said crank pin.

In testimony whereof I affix my signature.

PERCY H. HERRICK.